(12) United States Patent
Lenderink et al.

(10) Patent No.: US 8,531,111 B2
(45) Date of Patent: Sep. 10, 2013

(54) LIGHT MODULE

(75) Inventors: Egbert Lenderink, Eindhoven (NL); Oscar Hendrikus Willemsen, Eindhoven (NL); Georges Marie Calon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 136 days.

(21) Appl. No.: 13/320,987

(22) PCT Filed: May 5, 2010

(86) PCT No.: PCT/IB2010/051976
§ 371 (c)(1),
(2), (4) Date: Nov. 17, 2011

(87) PCT Pub. No.: WO2005/133993
PCT Pub. Date: Nov. 25, 2010

(65) Prior Publication Data
US 2012/0062121 A1    Mar. 15, 2012

(30) Foreign Application Priority Data
May 20, 2009  (EP) ..................................... 09160796

(51) Int. Cl.
*H05B 37/02* (2006.01)
(52) U.S. Cl.
USPC .......................................................... 315/118
(58) Field of Classification Search
None
See application file for complete search history.

(56) References Cited

U.S. PATENT DOCUMENTS

2007/0273290 A1* 11/2007 Ashdown et al. ............. 315/113
2010/0148702 A1*  6/2010 Shen ............................. 315/309

FOREIGN PATENT DOCUMENTS

| EP | 2073607 A1 | 6/2009 |
|---|---|---|
| WO | 2004068909 A1 | 8/2004 |
| WO | 2009044340 A2 | 4/2009 |
| WO | 2009095817 A1 | 8/2009 |

OTHER PUBLICATIONS

Farkas G. et al, "Electric and Thermal Transient Effects in High Power Optical Devices", Semiconductor Thermal Measurement and Management Symposium, 2004. Twentieth Annual IEEE, San Jose, CA, USA, Mar. 9-11, 2004, pp. 169-177, XP010714815, ISBN: 978-0-7803-8364-7.

(Continued)

*Primary Examiner* — Crystal L Hammond
(74) *Attorney, Agent, or Firm* — Mark L. Beloborodov

(57) ABSTRACT

The invention relates to a light module for electrical and thermal attachment to an energy infrastructure having at least one power supply, each power supply comprising two electrodes, said light module comprising a light source to emit light, wherein the light source is a heat source when emitting light, two electrical contacts to contact the electrodes of the at least one power supply and thereby establishing the electrical attachment between the light module and the energy infrastructure, a control system arranged between the light source and the electrical contacts to control a power supplied to the light source, wherein the light module comprises a measurement system to measure a thermal resistance of the thermal attachment between the light module and the energy infrastructure when establishing the electrical attachment, and wherein the control system is configured to reduce the power supplied to the light source when the thermal resistance is above a predetermined value to protect the light module from overheating. The invention also relates to a method for protecting a light module from overheating.

19 Claims, 2 Drawing Sheets

(56) References Cited

OTHER PUBLICATIONS

Lan Kim et al, "Thermal Resistance Measurement of LEDs with Multi-Chip Packages", Semiconductor Thermal Measurement and Management Symposium, Twenty-Sec and Annual IEEE, Dallas, TX USA, Mar. 14-16, 2006, Piscataway, NJ, USA, IEEE, pp. 14 Mar. 2006, pp. 186-190, XP010912402, ISBN: 978-1-4244-0153-6.

* cited by examiner

LIGHT MODULE

FIELD OF THE INVENTION

The invention relates to the field of light modules, and more specifically to light modules for electrical and thermal attachment to an energy infrastructure.

BACKGROUND OF THE INVENTION

A light module comprises a light source to emit light and is preferably easily attachable to an energy infrastructure having at least one power supply, wherein each power supply comprises two electrodes. The energy infrastructure may take the form of the well known halogen wire systems or a 2D electrode configuration.

Preferably, the attachment of the light module to the energy infrastructure is made by hand without using any additional tools, for example by clamping and/or magnetic sticking. This allows a user without technical knowledge to attach the light module to the energy infrastructure. However, screwing or bolting is also possible.

The light source is usually also a heat source when emitting light, and in order to keep the light module small, it is desirable to transfer the generated heat to the energy infrastructure, rather than equipping the light module with its own heat sink. It is therefore important that besides an electrical attachment for power supply also a thermal attachment is established between the light module and the energy infrastructure.

A drawback of the current light modules is that when a user positions or repositions the light module, there is a risk of insufficient thermal contact resulting in a relatively high thermal resistance of the thermal attachment. The light module will then overheat, which reduces the light output and may even cause permanent damage to the light module.

Solutions are proposed to measure the temperature of the light module, thereby monitoring if the light module is overheated and take appropriate measures. However, a drawback of these solutions is that when overheating is measured, the light module already has some so-called burning time at an elevated temperature, which still may cause damage to the light module. Another drawback may be that the user does not get immediate feedback that the thermal contact between light module and energy infrastructure is insufficient.

SUMMARY OF THE INVENTION

It would be desirable to provide an improved light module which is protected from overheating. It would also be desirable to provide an improved light module which gives immediate feedback to a user about the sufficiency of the thermal attachment.

To better address one or more of these concerns, in a first aspect of the invention a light module for electrical and thermal attachment to an energy infrastructure having at least one power supply, each power supply comprising two electrodes, said light module comprising a light source to emit light, wherein the light source is a heat source when emitting light, two electrical contacts to contact the electrodes of the at least one power supply and thereby establishing the electrical attachment between the light module and the energy infrastructure, a control system arranged between the light source and the electrical contacts to control a power supplied to the light source, wherein the light module comprises a measurement system to measure a thermal resistance of the thermal attachment between the light module and the energy infrastructure when establishing the electrical attachment, and wherein the control system is configured to reduce the power supplied to the light source when the thermal resistance is above a predetermined value to protect the light module from overheating.

Also a method is provided to protect a light module against overheating, said method comprising the steps of:

connecting the light module to the energy infrastructure, thereby establishing an electrical attachment between the light module and an energy infrastructure;

measuring a thermal resistance of a thermal attachment between the light module and the energy infrastructure by a measurement system;

reducing a power supplied to the light source by a control system when the thermal resistance is above a predetermined value to protect the light module from overheating.

Further, in combination a light module for electrical and thermal attachment to an energy infrastructure and the energy infrastructure is provided, said energy infrastructure having at least one power supply, each power supply comprising two electrodes, and said light module comprising a light source to emit light, wherein the light source is a heat source when emitting light, two electrical contacts to contact the electrodes of the at least one power supply and thereby establishing the electrical attachment between the light module and the energy infrastructure, a control system arranged between the light source and the electrical contacts to control a power supplied to the light source, wherein the light module comprises a measurement system to measure a thermal resistance of the thermal attachment between the light module and the energy infrastructure when establishing the electrical attachment, and wherein the control system is configured to reduce the power supplied to the light source when the thermal resistance is above a predetermined value to protect the light module from overheating.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
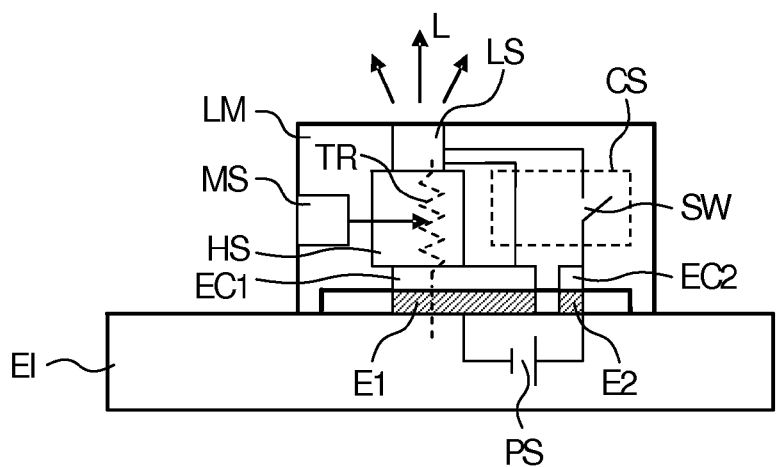
FIG. 1 depicts a schematic representation of a light module according to an embodiment of the invention.

FIG. 1 depicts a light module LM for electrical and thermal attachment to an energy infrastructure EI having at least one power supply PS, wherein each power supply comprises two electrodes E1, E2. The light module LM comprises a light source LS to emit light L which is a heat source when emitting light L, two electrical contacts EC1, EC2 to contact the electrodes E1, E2 of the at least one power supply PS and thereby establishing the electrical attachment between the light module LM and the energy infrastructure EI, a control system CS arranged between the light source LS and the electrical contacts EC1, EC2 to control a power supplied to the light source LS, and a measurement system MS to measure a thermal resistance TR of the thermal attachment between the light module LM and the energy infrastructure EI when establishing the electrical attachment. The control system CS is configured to reduce the power supplied to the light source LS when the thermal resistance TR is above a predetermined value to protect the light module LM from overheating.

In an embodiment, the power supplied to the light source LS is controlled by a duty cycle of the power, i.e. the duty cycle of the light source. The duty cycle is the fraction of time that power is transferred to the light source LS to emit light L. The two extremes are a duty cycle of 0, or 0%, in which the light source does not emit light at all, and a duty cycle of 1 or 100% in which the light source LS continuously emits light. In between the two extremes, the light source alternatingly does emit and does not emit light L. Preferably, the light source is controlled using a rectangular waveform, so that the duty cycle alternatively can be defined as the ratio between an "on" state in which the light source emits light and an "off" state in which the light does not emit light.

The light module is shown in a state wherein it is connected to the energy infrastructure and electrical contacts EC1, EC2 are in electrical contact with electrodes E1, E2 respectively. The duty cycle of the power transferred to the light source is controlled by the control system which in this embodiment controls a switch SW. Closing the switch SW will close the electrical circuit so that the power supply PS is able to supply power to the light source and the light source will emit light L. Opening the switch will disconnect the power supply from the light source, thereby preventing the power supply from supplying power to the light source so that no light L is emitted.

The control system may be configured to reduce the power supplied to the light source by reducing the duty cycle of the power when the thermal resistance is above the predetermined value. The control system may additionally or alternatively be configured to reduce the power supplied to the light source by reducing an amplitude of the power transferred to the light source.

In this embodiment, a heat spreader HS is arranged between the light source LS and the electrical contact EC1. The heat spreader is made from electrically isolating material to electrically isolate the heat spreader from electrical contact EC1. Heat generated by the heat source is able to be transferred from the light source to the energy infrastructure via the heat spreader, the electrical contact EC1 and the electrode E1. The thermal resistance of this thermal attachment is indicated by thermal resistance TR. Preferably, the thermal resistance of the heat spreader is relatively low, so that the critical thermal resistance is the thermal resistance between electrical contact EC1 and electrode E1.

The electrode E1 and corresponding electrical contact EC1 are both larger than the electrode E2 and electrical contact EC2 respectively. This provides a minimal thermal resistance if a good thermal contact is established, so that the light module can be protected from overheating.

As a low thermal resistance is required to protect the light module from overheating, the measurement system measures the thermal resistance. If the thermal resistance is above a predetermined value, causing a risk of overheating, the control system will modify the power supplied to the light source, e.g. reduce the duty cycle of the light source. This has the advantage that the generated heat by the light source is reduced and the light module is protected from overheating. Measuring the thermal resistance has the advantage that the sufficiency of the thermal contact can be determined relatively quickly for instance with respect to a temperature measurement in which one has to wait before the temperature reaches a predetermined limit. Another advantage may be that in case of reducing the duty cycle of the light source, a visual indication is provided to a user that the thermal contact is insufficient.

Preferably, the "normal" duty cycle in case the thermal resistance is below a predetermined value is such that a nominal operating current is achieved and may be up to 100%. A good visual indication can be obtained when the duty cycle is reduced such that the light source is flashing when the thermal resistance is above a predetermined value, wherein the duty cycle may be reduced to below 50%. It is also possible to reduce the duty cycle to 0% when the thermal resistance is above a predetermined value, so that the light source is off, i.e. shutdown, also clearly indicating that the thermal contact is not sufficient. The flashing warning signal is preferred over the off warning signal as the flashing warning signal also indicates that the electrical attachment is established and the light module is not broken.

Other warning signals, such as a sound or vibration are also possible to warn a used and give immediate feedback about the thermal contact.

The thermal resistance may be determined by measuring an electrical resistance of the contact between electrical contact EC1 and electrode E1. Both the electrical resistance and the thermal resistance depend on the physical contact between the electrical contact EC1 and the electrode E1, so that the electrical resistance is a measure for the thermal resistance.

Preferably, the electrical resistance is determined in a way that the influence of the current supplied to the light module on the measurement is minimal. An example of such a way is shown in FIG. 2

Figure 2:
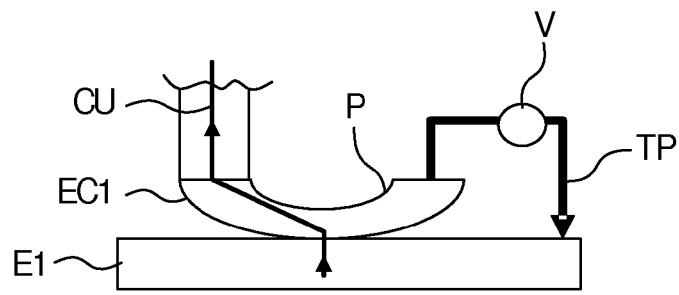
FIG. 2 depicts a detailed view of a measurement system of a light module according to an embodiment of the invention.

FIG. 2 shows an example of a measurement system of a light module to measure a thermal resistance between an electrical contact EC1 and an electrode E1. The thermal resistance is measured by measuring an electrical resistance, i.e. contact resistance, between the electrical contact EC1 and the electrode E1. The measurement system therefore comprises a voltage meter V connected to the electrode E1 by a test pin TP and a part P of the electrical contact EC1 that does not carry current CU, so that the measured voltage is a measure for the contact resistance between electrical contact EC1 and electrode E1 and does not include material resistances in the electrical contact EC1 and/or electrode E1.

Figure 3:
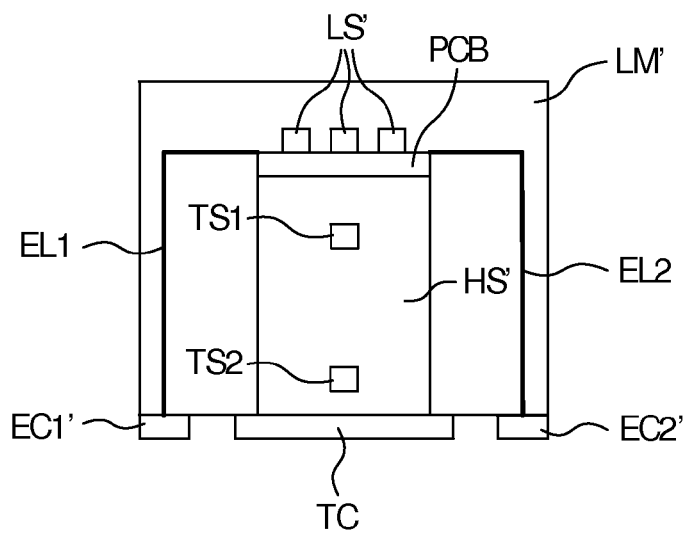
FIG. 3 depicts a schematic representation of a light module according to another embodiment of the invention.

FIG. 3 depicts a schematic representation of a light module LM' according to another embodiment of the invention. The light module LM' is suitable for electrical and thermal attachment to an energy infrastructure (not shown) having at least one power supply, each power supply comprising two electrodes.

The light module LM' comprises a printed circuit board PCB on which multiple light sources LS' (such as LED's) are provided to emit light. The light sources LS' are a heat source when emitting light. A control system is also provided on the PCB to control a power supplied to the light sources LS', for instance with a duty cycle.

The light module LM' further comprises two electrical contacts EC1', EC2' to contact the electrodes of the at least one power supply and thereby establish the electrical attachment between the light module and the energy infrastructure. The electrical contacts are connected to the printed circuit board PCB via electrical lines EL1, EL2, respectively.

A heat spreader HS' is arranged between the light sources LS' and the energy infrastructure when the electrical attachment is established. The heat spreader HS' comprises a thermal contact pad TC to establish the thermal attachment between the light module and the energy infrastructure.

The light module comprises a measurement system to measure a thermal resistance of the thermal attachment between the light module and the energy infrastructure. The measurement system is configured to determine the thermal resistance of the thermal attachment by measuring a heat flow from the light sources to the energy infrastructure. In this embodiment, the measurement system is provided with two temperature sensors TS1, TS2. Temperature sensor TS1 is located in the heat spreader HS' near the light sources and temperature sensor TS2 is located in the heat spreader HS' near the thermal contact pad TC, i.e. near the energy infrastructure when the thermal attachment is established.

Heat flow can be defined as a temperature difference divided by a thermal resistance. When the thermal contact between thermal contact pad TC and the energy infrastructure is sufficient, the total thermal resistance will be relatively low. As a result, the light module will be relatively fast in thermal equilibrium with the energy infrastructure as only a small temperature difference is required to establish a heat flow which corresponds to the amount of heat generation by the heat source, i.e. the light source.

When the thermal contact between thermal contact pad TC and the energy infrastructure is not sufficient, the total thermal resistance will be relatively high. As a result, the light module will more slowly reach thermal equilibrium as a large temperature difference is required to establish a heat flow which corresponds to the amount of heat generation by the heat source, i.e. the light source. This difference in heat flow as a function of time can be detected to determine if the thermal contact is sufficient.

It is also possible to provide a small convector or radiator that is connected to the heat spreader HS' to provide an alternative route for heat to flow away. A higher thermal resistance will then result in more "leakage" of heat through the convector or radiator, so that the heat flow via the heat spreader and the thermal contact pad decreases. This decrease in heat flow is then measured as a decreased temperature difference.

Figure 4:
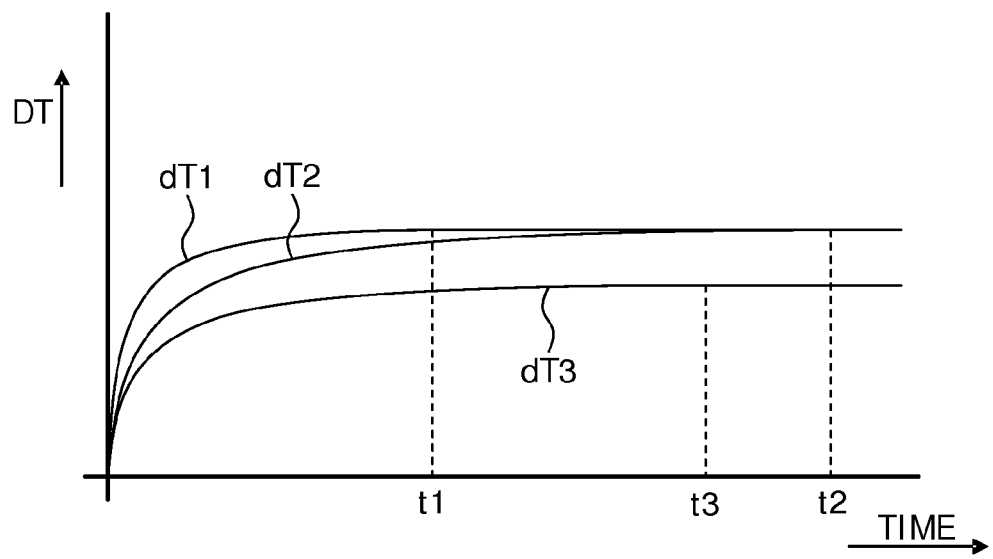
FIG. 4 depicts temperature difference paths one in case of sufficient thermal contact and two in case of insufficient thermal contact.

FIG. 4 depicts the temperature difference paths measured by the temperature sensors TS1, TS2 of FIG. 3 in the case the thermal contact between light module and energy infrastructure is sufficient and in two cases the thermal contact between light module and energy infrastructure is insufficient. The vertical axis is the temperature difference DT, and the horizontal axis is the time TIME.

Temperature difference path dT1 is the temperature difference versus time measured by temperature sensors TS1, TS2 in case the thermal contact is sufficient. At time t1, an equilibrium is substantially reached after which the heat flow through the heat spreader becomes constant resulting in a constant temperature difference.

Temperature difference path dT2 is the temperature difference versus time measured by temperature sensors TS1, TS2 in case the thermal contact is insufficient and no additional heat path, e.g. a convector, radiator, or other conductive path, is provided. At time t2, an equilibrium is substantially reached after which the heat flow through the heat spreader becomes constant resulting in a constant temperature difference. As the thermal resistance is higher due to the insufficient thermal contact, it takes longer for the equilibrium to be reached.

Temperature difference path dT3 is the temperature difference versus time measured by temperature sensors TS1, TS2 in case the thermal contact is insufficient and an additional heat path, e.g. a convector, radiator, or other conductive path, is provided. At time t3, an equilibrium is substantially reached after which the heat flow through the heat spreader becomes constant resulting in a constant temperature difference. As the thermal resistance is higher due to the insufficient thermal contact, more heat will leak through the additional heat path so that the heat flow through the heat spreader via the thermal contact pad will be lower as is shown in FIG. 4.

The control system is thus able to measure the thermal resistance by looking at a certain time instant and determine if an equilibrium has been reached or not. It is also possible to look at the maximum heat flow in case of an additional heat path.

There is also the situation that no thermal contact is established resulting in no heat flow at all. However, measuring no heat flow at all may also mean that the light module is off, i.e. shutdown. In that case, a false warning signal may be given. To avoid this, it is also possible to measure in addition a current or a temperature.

It is also possible to use the information of one temperature sensor only to determine the thermal resistance. For instance, if temperature sensor TS1 is used and temperature sensor TS2 is omitted, the thermal resistance of the thermal attachment can also be determined by looking at the time derivative of the temperature measured by temperature sensor TS1. This shown in case of sufficient thermal contact and insufficient thermal contact in FIG. 5.

Figure 5:
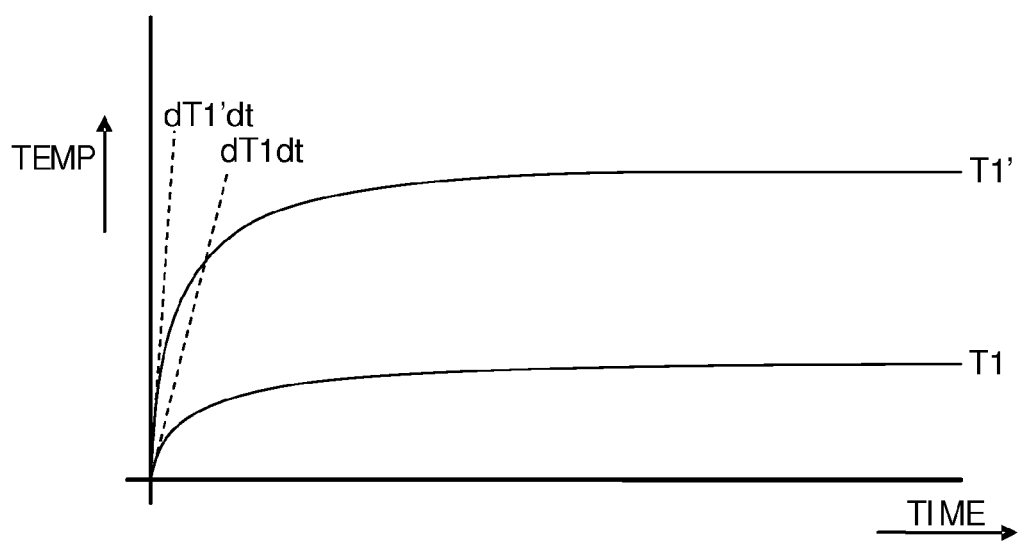
FIG. 5 depicts two temperature paths one in case of sufficient thermal contact and one in case of insufficient thermal contact.

FIG. 5 shows on the vertical axis the temperature TEMP, and on the horizontal axis the time TIME. Temperature path T1 shows the measured temperature of temperature sensor TS1 in case of sufficient thermal contact. Temperature path T1' shows the measured temperature of temperature sensor TS1 in case of insufficient thermal contact. For one time instant the rate of change of the temperature paths T1 and T1', i.e. the time derivatives of the temperature, are indicated by respectively lines dT1$dt$ and dT1'$dt$. When there is insufficient thermal contact, the temperature will rise more quickly than in case of sufficient thermal contact, so that the time derivative of the temperature is a measure for the thermal resistance.

The abovementioned embodiment and features may all apply to dimmable lighting systems as well. For some features which are obvious for the skilled person this may require a scaling of value with respect to a power level supplied to the light module.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfill the functions of several items recited in the claims.

The invention claimed is:

1. A light module for electrical and thermal attachment to an energy infrastructure having at least one power supply, each power supply comprising two electrodes, said light module comprising:
   a light source to emit light, wherein the light source is a heat source when emitting light,
   two electrical contacts to contact the electrodes of the at least one power supply and thereby establishing the electrical attachment between the light module and the energy infrastructure,
   a control system arranged between the light source and the electrical contacts to control a power supplied to the light source, and
   a measurement system to measure a thermal resistance of the thermal attachment between the light module and the energy infrastructure when establishing the electrical attachment, wherein the control system is configured to reduce the power supplied to the light source when the thermal resistance is above a predetermined value to protect the light module from overheating.

2. A light module according to claim 1, wherein the light source is a light emitting diode (LED).

3. A light module according to claim 1, wherein the control system is configured to reduce the power supplied to the light source by reducing a duty cycle of the power when the thermal resistance is above the predetermined value.

4. A light module according to claim 1, wherein the control system is configured to reduce the power supplied to the light source by reducing the amplitude of the power.

5. A light module according to claim 1, further comprising a heat spreader arranged between the light source and the energy infrastructure when the electrical attachment is established to establish the thermal attachment between the light module and the energy infrastructure.

6. A light module according to claim 5, wherein the heat spreader is connected to one of the two electrical contacts and electrically isolated from the other electrical contact, and wherein the measurement system is configured to determine the thermal resistance of the thermal attachment by measuring an electrical resistance of the contact between said one of the two electrical contacts and the corresponding electrode of the at least one power supply.

7. A light module according to claim 6, wherein the electrical resistance between said one of the two electrical contacts and the corresponding electrode of the at least one power supply is determined by measuring a voltage between said one of the two electrical contacts and the corresponding electrode.

8. A light module according to claim 5, wherein two temperature sensors are provided in the heat spreader to measure the heat flow from the light source to the energy infrastructure, one sensor located near the light source and the other sensor located near the energy infrastructure when the thermal attachment is established.

9. A light module according to claim 5, wherein the measurement system comprises a temperature sensor integrated in the heat spreader, and preferably located near the light source, to measure a time derivative of a temperature in the heat spreader.

10. A light module according to claim 1, wherein the measurement system is configured to determine the thermal resistance of the thermal attachment by measuring a heat flow from the light source to the energy infrastructure.

11. A light module according to claim 1, further comprising a warning system for providing a warning signal when the thermal resistance is above the predetermined value.

12. A method to protect a light module according to claim 1 against overheating, said method comprising the steps of:
   connecting the light module to the energy infrastructure, thereby establishing the electrical attachment between the light module and the energy infrastructure;
   measuring the thermal resistance of the thermal attachment between the light module and energy infrastructure by the measurement system;
   reducing the power supplied to the light source by the control system when the thermal resistance is above a predetermined value to protect the light module from overheating.

13. A method according to claim 12, wherein the power supplied to the light source is reduced by reducing a duty cycle of the power when the thermal resistance is above the predetermined value.

14. A method according to claim 12, wherein the power supplied to the light source is reduced by reducing the amplitude of the power when the thermal resistance is above the predetermined value.

15. A method according to claim 12, wherein a heat spreader is arranged between the light source and the energy infrastructure after connecting the light module to the energy infrastructure, said heat spreader being made from electrically isolating material and connected to one of the two electrical contacts, wherein the thermal resistance of the thermal attachment is determined by measuring the electrical resistance of the contact between said one of the two electrical contacts and the corresponding electrode of the at least one power supply.

16. A method according to claim 15, wherein the light source is a light emitting diode (LED), wherein the electrical resistance of the contact between said one of the two electrical contacts and the corresponding electrode of the at least one power supply is determined by measuring a voltage between said one of the two electrical contacts and the corresponding electrode.

17. A method according to claim 12, wherein the thermal resistance of the thermal attachment is determined by measuring a heat flow from the light source to the energy infrastructure.

18. A method according to claim 12, wherein a heat spreader is arranged between the light source and the energy infrastructure after connecting the light module to the energy infrastructure, and wherein the thermal resistance of the thermal attachment is determined by measuring a time derivative of a temperature in the heat spreader.

19. A method according to claim 12, comprising the step of providing a warning signal when the thermal resistance is above the predetermined value.

* * * * *